United States Patent Office 2,762,243
Patented Sept. 11, 1956

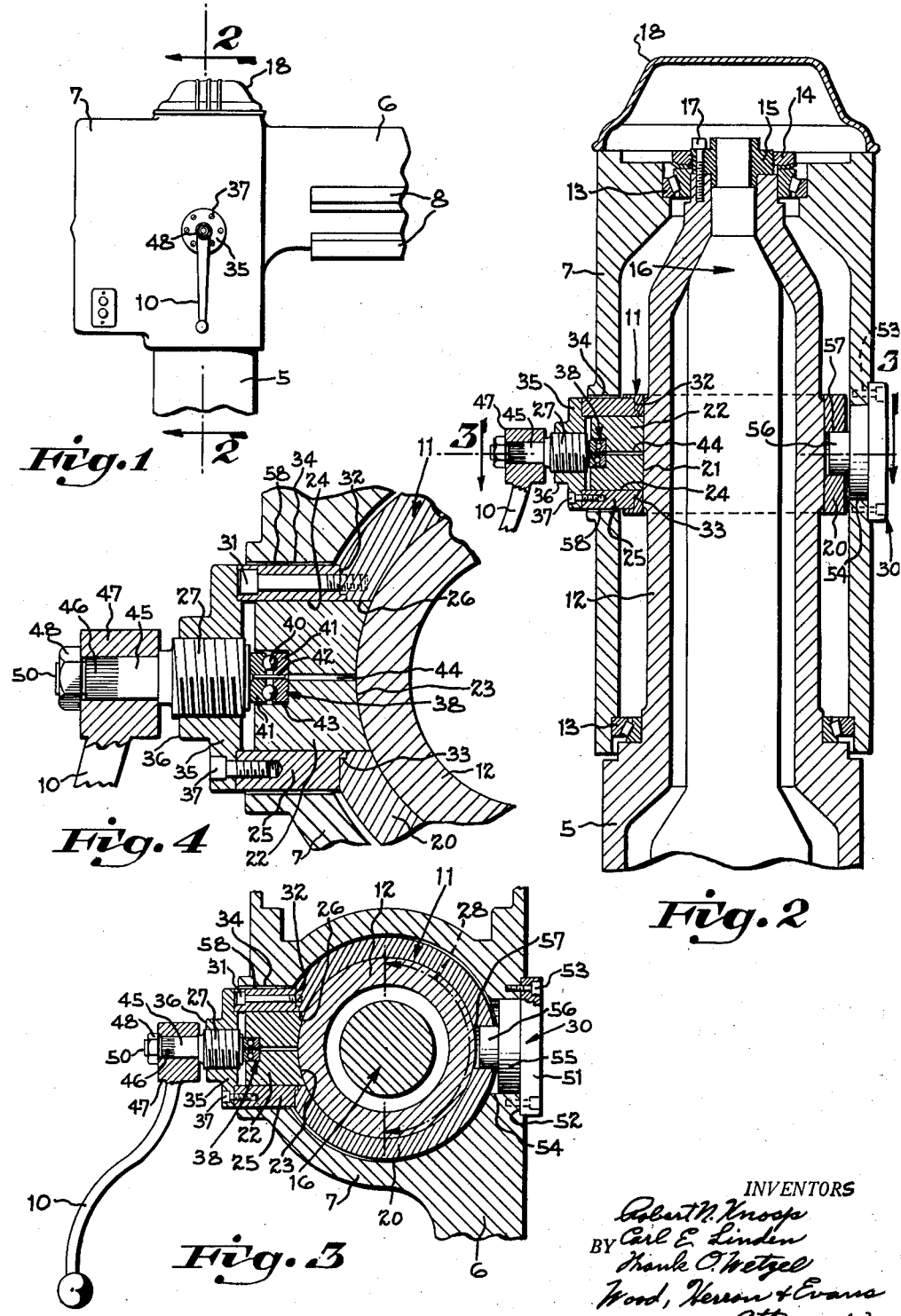

2,762,243

MACHINE TOOL CLAMPING MECHANISM

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application August 14, 1953, Serial No. 374,396

5 Claims. (Cl. 77—27)

This invention relates to an improved clamping mechanism for machine tools and has particular reference to a mechanism for clamping the shiftable arm of a radial drill firmly to its column.

The radial drill selected to illustrate the utility of the present mechanism is of a simplified type which includes a vertical column non-rotatably attached to a base, and a horizontal arm having an integral sleeve rotatably journalled upon the upper portion of the column, with the arm overhanging the base in cantilever fashion. The clamping mechanism is mounted in the arm sleeve and is utilized to clamp the arm firmly to the column in its selected radial position relative to the workpiece which is supported upon a work table mounted on the column beneath the arm.

From the following description, however, it will be understood that the mechanism is also intended for general utility in the machine tool field in clamping a movable member with respect to a cylindrical support. As one example, the mechanism may be utilized, without changing its principle of operation, as a column clamp for a radial drill of the type having a column mounted for rotation with respect to a base as distinguished from a fixed column. In this event the clamping mechanism is fixed relative to the base and is utilized to clamp the column against rotation relative to the base.

One of the problems posed by the radial drill having a fixed column and radially shiftable arm is the tendency of the clamping mechanism to impart a slight rotary inching of the arm sleeve relative to the column, causing the arm to be displaced radially from its adjusted position during the clamping operation. This action is due in most cases to an uneven application of clamping pressure or unequal motion of the clamping elements, whereby a tangential force is developed at one or more points about the circumference of the clamping interface. The tendency to creep is also exhibited by drills of the rotary column type. Any such motion is multiplied at the outer portion of the arm which carries the tool, thus displacing the tool from its alignment with the hole center of the work.

One of the primary objects of the invention has been to provide a clamping mechanism in which a floating ring, anchored to the sleeve and loosely encircling the column, is shifted along a line generally lateral to the central axis of the column to provide the frictional engagement without imparting any relative creep between column and sleeve. The ring comprises a self-contained clamping member as explained later, the clamping force being confined to the ring and isolated from the sleeve; therefore, no force is developed tending to rotate the sleeve relative to the column. Of equal significance, the floating ring and its components grip the column without imposing any relative force between the sleeve and column, thereby eliminating any tendency to spring the two parts from their normal relationship.

Essentially, the clamping mechanism comprises a one-piece floating ring disposed between the sleeve and column and loosely journalled on the column, the ring being anchored at one point around its circumference to the sleeve; thus the ring rotates with the sleeve as an integral part relative to the column. Clamping pressure is applied to the ring by a screw which is threaded through a collar anchored to the ring. The inner end of the screw engages a clamping shoe loosely confined in the collar and having an end exposed to the periphery of the column. The shoe is located diametrically opposite the point at which the ring is anchored to the sleeve and, upon rotation of the screw, the shoe is forced under high pressure against the column. This force reacts in tension through the ring and accordingly, the ring hugs the column providing a pressure interface extending for a substantial extent of the column periphery. Since the ring is firmly anchored to the sleeve, the sleeve and arm are rigidly clamped to the column when the ring is forced by the screw and clamping shoe against the column.

The floating ring is anchored to the sleeve by a rigid cylindrical plug extending radially from the sleeve and fitting snugly into a bore formed in the ring. This provides an anchorage which locks the ring to the sleeve against relative radial movement but which allows the ring to float laterally relative to the axis of the column as it is shifted to clamping and unclamping positions. Accordingly, forceful contraction of the floating ring about the column imposes no strain relative to the sleeve and column in any direction and causes no disturbance to the normal bearing engagement of the sleeve with respect to the column either radially or axially. Upon being unclamped, the clamping shoe relaxes and the ring loosely encircles the column and allows the sleeve to rotate freely upon its bearings as the arm is shifted radially to a selected position.

A further object has been to provide a simple mechanism for applying the clamping force manually in an efficient manner without undue physical effort. For this purpose, a manually operated lever is connected directly to the outer end of the actuating screw, the screw being threaded through a collar which is attached to the ring and which slidably confines the clamping shoe. A ball thrust bearing is interposed between the end of the screw and clamping shoe to reduce the amount of resistance to screw rotation as the manual lever is actuated.

Further objects and advantages of the invention will be more fully apparent to those skilled in the art from the following detailed description taken in conjunction with the drawings.

In the drawings:

Figure 1 is a fragmentary side view of the upper portion of the column and arm of a radial drill incorporating the present clamping structure.

Figure 2 is an enlarged vertical section taken on line 2—2, Figure 1, generally illustrating the clamping mechanism in relation to the arm and column.

Figure 3 is a horizontal section taken on line 3—3, Figure 2, further illustrating the mechanism.

Figure 4 is an enlarged fragmentary sectional view taken from Figure 3, illustrating in greater detail the clamping block and its actuating mechanism in relation to the clamping ring and column.

The radial drill which is selected to illustrate the use of the present clamping mechanism comprises a cylindrical column disposed in a vertical position as indicated at 5, having at its upper end an overhanging arm 6 which is rotatably journalled upon the column. For this purpose, the inner end of the arm includes a sleeve 7 journalled upon the upper portion of the column by means of roller bearings, as explained later. In the machine illustrated in Figure 1, the column rises vertcially from a base (not shown), the column having its lower end non-rotatably attached to the base. Upon the column below the arm there is mounted a work supporting table (not shown) which extends in cantilever fashion in a horizontal plane beneath the over-hanging arm 6. The arm also carries a drill head (not shown) which is slidably mounted upon the horizontal ways 8 of the arm, the head being movable horizontally with respect to the work supporting table. The head includes a vertical, power driven drill spindle arranged to be fed axially, the spindle carrying a drill or other tool at its lower end for rotation relative to the work which is mounted upon the table.

In order to center the drill with the hole centers of the work, the arm is swung radially in a horizontal plane relative to the table and the drill head is shifted longitudinally along the arm, thereby aligning the drill axially with the hole center. When the drill is accurately aligned, the arm is clamped rigidly in its radial position by manually swinging the clamping lever 10 which is located at the operator's side of the machine. This actuates the clamping mechanism indicated generally at 11 in Figure 2, and establishes a rigid clamping engagement between the sleeve 7 and column 5. The drill head is then clamped to its ways 8 on the arm and the machine is ready to execute the drilling or other machining operation upon applying power to the drill spindle and feeding it axially toward the work. After completing the operation, the spindle is retracted from the work and the clamp is disengaged to allow the arm to be adjusted for the next hole.

Referring to Figure 2, the upper end portion of the column 5 is counter-turned to provide a reduced diameter 12 which forms a journal for the arm sleeve 7. Sleeve 7 is rotatably journalled upon roller bearing 13—13 seated in its upper and lower ends and embracing the column, the bearings being of the tapered radial and thrust type, arranged to provide axial take-up adjustment. For this purpose an adjustment nut 14 engages the inner race of the upper bearing, the nut being threaded upon a collar 15 which is mounted upon the upper end of a post 16 which extends through the hollow column. The collar is locked against rotation by a cap screw 17 passing through the collar and threaded into the end of the column. The sleeve includes at its upper end a closure cap 18 which protects the bearings and clamping mechanism against dirt and dust.

The clamping mechanism 11 provides a direct clamping engagement of the sleeve 7 to the column by operation of a floating clamping ring 20 which is firmly locked against rotation relative to the sleeve. As best shown in Figure 2, the column is provided with an enlarged diameter 21 at the ring which forms a ring bearing surface having a width equal to the ring. The ring and column bearing surfaces are machined to a fine finish to provide smooth operation. As explained in detail later, the ring encircles the column and rotates in unison with the sleeve as the arm is shifted radially. In addition, the ring is free to float laterally relative to the column when unclamped. Upon being clamped, the ring forcibly embraces the column by contraction, the force of contraction being confined to the ring and its associated parts and completely isolated from the sleeve. As the ring contracts, it floats laterally relative to the sleeve while remaining radially locked to it and thereby locks the sleeve and arm firmly to the column.

The contraction of the floating ring to clamping engagement is such that no inching or creeping motion is imparted to the sleeve tending to shift the arm away from its adjusted position. Moreover, the ring by its floating connection, imparts no force relative to the sleeve and column either radially or axially as it contacts about the column. Therefore, the roller bearings 13—13 remain at normal loading whether the arm is clamped or unclamped and there is no tendency to spring the sleeve and arm or to overload the bearings under clamping pressure.

Clamping pressure is applied to ring 20 by the clamp shoe 22 which is provided with an arcuate clamping face 23 seated against the periphery of the column. The clamp shoe preferably is cylindrical and is confined in the cylindrical bore 24 of a collar 25 which is attached to the ring, and extends outwardly with its axis radial to the center of the ring. The ring is provided with a lateral bore 26 in axial alignment with bore 24 of the collar to accommodate the end of the shoe which projects through the ring to the column. Clamping pressure is applied to the outer end of the clamp shoe by means of the screw 27 which is rotated by the clamping lever 10 previously noted.

When the screw is rotated in clamping direction, it forces the shoe inwardly against the column while this force reacts in tension through the collar in which the screw is threaded. The collar in turn, being attached to the clamping ring, draws the ring into clamping engagement with the column. The column is thus engaged on one side by the shoe and on the diametrically opposite side by the clamping ring which provides a clamping interface extending for approximately to the center half the circumference of the column as indicated by the arrows 28 in Figure 3. The sleeve 7 is keyed to the ring by means of the cylindrical plug 30 which is located upon an axis common to screw 27 on the diametrically opposite side of the ring as explained later; thus, the sleeve is locked firmly when the ring grips the column.

Described in detail, the cylindrical collar 25 is attached to the ring by a series of cap screws 31 passing through the collar and having their heads counter-sunk in its outer portion, the inner ends of the screws being threaded into the ring. The inner end of the collar is seated upon a flat 32 which is machined on the external periphery of the ring. In addition the flat is counter-bored to seat the pilot flange 33 projecting outwardly from the end of the collar, the counterbore being concentric to the bore 26 through which the shoe passes, as explained earlier. The collar projects outwardly through a bore 34 formed in the sleeve but is not attached to the sleeve.

Screw 27 is threaded through a cap 35 which includes a hub 36, the cap being provided at its center with a tapped hole to provide a threaded engagement with the screw. The cap is attached to the end of the collar by the cap screws 37 threaded into the end of the collar. The inner end of the screw 27 bears against a thrust bearings 38 having a series of balls 40 confined between the races 41—41. For assembly purposes, the races are rotatably connected together by the axial rivet 42. The races are confined in a bore 43 formed in the end of the clamping shoe and a hole 44 is drilled axially through the shoe to accommodate a pin suitable to dislodge the bearings if necessary.

The outer end of screw 27 includes an integral stub shaft 45 having a knurled or serrated outer portion 46 mating with a knurled bore formed in the hub 47 of the clamp lever 10. The hub is secured upon the stub shaft 45 by a nut 48 threaded upon the end 50 of the stud. The knurled connection allows the clamping lever to be keyed to the screw at a selected radial clamping angle for most efficient operation. In addition, it allows the lever to be repositioned in the event that the clamping range changes because of wear upon the screw threads.

Referring to Figure 3, the cylindrical plug 30 includes a flange 51 which is seated against a flat 52 machined into the surface of the sleeve at the arm. The block is attached by a series of cap screws 53 passing through the flange into threaded engagement with the sleeve. The sleeve includes a bore 54 which is machined to provide a snug fit with the cylindrical portion 55 of the plug, the flat 52 and bore being effective to locate the cylindrical plug accurately upon an axis common to the axis of the clamping screw which is diametrically opposite. The cylindrical plug includes a concentric stud portion 56 of reduced diameter and the clamping ring includes a cylindrical bore 57 which is machined to provide a precision slide fit with the stud. The fitting of the stud is such that all clearance is eliminated except that the ring is free to shift minutely along the axis of stud 56 and laterally to the axis of the column; therefore in effect, the arm is rigidly keyed to the column itself when ring 20 is firmly clamped. Accordingly, the drill spindle is locked firmly in alignment with the hole center and cannot be dislodged even under considerable force acting upon the outer end of the arm.

By operation of the floating ring and shoe, all clamping forces are confined in the ring itself and completely isolated from the sleeve. The cylindrical collar 25 operates only to provide the clamping force and is also free to float slightly with respect to the bore 34 of the sleeve through which it projects. For this purpose, slight clearance indicated at 58 is provided between the cylindrical collar and its bore.

From the foregoing, it will be observed that the isolated clamping pressure of the contracted floating ring has no tendency to inch the sleeve or to spring it in any direction relative to the column. The arm and drill spindle thus remain precisely in radially adjusted position during clamping and no strain is imposed upon the sleeve bearings. In unclamped condition, the ring is completely relaxed and loosely related to the column, thus allowing the sleeve to rotate freely upon its roller bearings as the arm is adjusted.

Having described our invention we claim:

1. In a machine tool having a cylindrical column and an element including a sleeve embracing the column and providing an annular space between the sleeve and column, said sleeve and column being movable relative to one another; a clamping mechanism for clamping the sleeve and column in fixed position relative to one another comprising, a clamping member disposed in said annular space and loosely encircling the column, connecting means on the sleeve engaging the clamping member, the connecting means projecting inwardly along an axis generally radial to the axis of the column and providing a sliding connection with the clamping member, whereby the clamping member is non-rotatably anchored to the sleeve and is free to float laterally relative to the axis of the sleeve and column in said annular space, the clamping member having an opening extending through the wall thereof on an axis generally radial to the axis of the column, a clamping shoe slidably mounted in said opening and having an inner end exposed to the periphery of the column, and actuating means anchored on the clamping member including a screw element engaging the outer end of the clamping shoe for forcing the shoe into pressure engagement against the periphery of the column, whereby the column is gripped from diametrically opposite sides between the clamping shoe and clamping member.

2. In a machine tool having a cylindrical column and an element including a sleeve embracing the column and providing an annular space between the sleeve and column, said sleeve and column being movable relative to one another; a clamping mechanism for clamping the sleeve and column in fixed position relative to one another comprising, a clamping member disposed in said annular space and loosely embracing the column, connecting means on the sleeve engaging the clamping member, the connecting means projecting inwardly upon an axis generally radial to the axis of the column and providing a sliding connection with the clamping member, whereby the clamping member floats laterally relative to the axis of the sleeve and column in said annular space, the clamping member having a bore extending through the wall thereof upon an axis generally radial to the axis of the column, a collar attached to the clamping member, the collar having a bore concentric to the bore of the clamping member, a clamping shoe slidably mounted in the bore of the collar and clamping member and having an inner end exposed to the periphery of the column, and an actuating screw threaded through the outer end of the collar and engaging the outer end of the clamping shoe for forcing the shoe into pressure engagement against the periphery of the column, whereby the column is gripped from diametrically opposite sides between the clamping shoe and clamping member to clamp the sleeve and column without imposing relative force therebetween.

3. In a machine tool having a cylindrical column and an arm including a sleeve embracing the column and providing an annular space between the sleeve and column, said sleeve and column being movable relative to one another; a clamping mechanism for clamping the sleeve and column relative to one another comprising a ring disposed in said annular space and extending loosely around the cylindrical column, said ring having a bore through the wall thereof disposed upon an axis radial to the center of the column, a cylindrical plug mounted upon the sleeve on an axis radial to the center of the column, said plug projecting inwardly through the bore of the sleeve, said plug providing a sliding fit with the bore and anchoring the ring non-rotatably to the sleeve, whereby the ring floats laterally relative to the column and sleeve, the ring having a second bore formed in the wall thereof on the side opposite to the first bore, a clamping shoe slidably mounted in said bore, the clamping shoe having an inner end exposed to the periphery of the column, and actuating means anchored upon the ring including a screw element engaging the outer end of the clamping shoe for forcing the clamping shoe and ring into pressure engagement with the periphery of the column, whereby the column is gripped from diametrically opposite sides between the clamping shoe and floating ring.

4. In a machine tool having a cylindrical column and an arm including a sleeve movably embracing the collar and providing an annular space between the sleeve and column, said sleeve having a bore through the wall thereof radial to the center of the sleeve; a clamping mechanism for clamping the sleeve and column relative to one another comprising, a ring member disposed in said annular space and extending loosely around the cylindrical column, the ring having a pair of coaxial bores through the wall thereof on opposite sides, a plug mounted upon the sleeve and projecting slidably through one of the bores of the ring, said plug anchoring the ring non-rotatably to the sleeve and providing lateral movement of the ring relative to the column and sleeve, a collar having a cylindrical bore, the collar having an inner end attached to the periphery of the ring with its bore concentric to the second bore of the ring, the collar projecting outwardly through the bore of the sleeve, a clamping shoe slidably mounted in the bore of the collar having an inner end exposed to the periphery of the column, an actuating screw threaded through the outer end of the collar, and a lever attached to the outer end of the screw for rotating the screw and forcing the clamping shoe and ring laterally relative to one another into pressure engagement with the periphery of the column, whereby the column is gripped on diametrically opposite sides between the shoe and ring.

5. In a machine tool having a cylindrical column and an arm including a sleeve movably embracing the collar and providing an annular space between the sleeve and column, said sleeve having a bore through the wall thereof radial to the center of the sleeve; a clamping mechanism for clamping the sleeve and column relative to one another comprising, a ring member disposed in said annular space and extending loosely around the cylindrical column, the ring having a pair of coaxial bores through the wall thereof on opposite sides, a plug mounted upon the sleeve and projecting slidably through one of the bores of the ring, said plug anchoring the ring non-rotatably to the sleeve and providing lateral movement of the ring relative to the column and sleeve, a collar having a cylindrical bore, the collar having an inner end attached to the periphery of the ring with its bore concentric to the second bore of the ring, the collar projecting outwardly through the bore of the sleeve, a clamping shoe slidably mounted in the bore of the collar having an inner end exposed to the periphery of the column, an actuating screw threaded through the outer end of the collar, an anti-friction thrust bearing interposed between the inner end of the screw and the outer end of the clamping shoe, and a lever attached to the outer end of the screw for rotating the screw and forcing the clamping shoe and ring laterally relative to one another, whereby the periphery of the column is gripped on diametrically opposite sides between the ring and shoe.

References Cited in the file of this patent

UNITED STATES PATENTS 408,291    Bullard _____ Aug. 6, 1889

FOREIGN PATENTS 485,902    Great Britain _____ May 26, 1938